Sept. 2, 1969          H. H. WAGNER          3,464,202

DENSITY LIMITING TURBOCHARGER CONTROL SYSTEM

Filed Nov. 14, 1967          2 Sheets-Sheet 1

INVENTOR.
HAROLD H. WAGNER
ATTORNEYS

Sept. 2, 1969    H. H. WAGNER    3,464,202
DENSITY LIMITING TURBOCHARGER CONTROL SYSTEM
Filed Nov. 14, 1967    2 Sheets-Sheet 2

INVENTOR.
HAROLD H. WAGNER
BY
ATTORNEYS

United States Patent Office /

3,464,202
Patented Sept. 2, 1969

3,464,202
DENSITY LIMITING TURBOCHARGER CONTROL SYSTEM
Harold H. Wagner, Peoria, Ill., assignor to Caterpillar Tractor Co., Peoria, Ill., a corporation of California
Filed Nov. 14, 1967, Ser. No. 682,902
Int. Cl. F02b 33/00; F02m 7/00
U.S. Cl. 60—13                                            8 Claims

ABSTRACT OF THE DISCLOSURE

A density limiting intake air control system for turbocharged, carburated, internal combustion engines, which prevents the engine from progressively increasing its power until unsafe operating conditions are reached, employs a regulator sensitive to pressures and temperature to control the throttling means operable to limit the flow of supercharged air from the turbocharger, so a maximum safe density is never exceeded in the cylinders of the engine.

BACKGROUND OF THE INVENTION

Intake systems for turbocharged, internal combustion engines can cause such engines to develop unsafe operating conditions if the turbocharging system is not controlled. Such conditions may occur when the throttle is opened to increase power output since the available exhaust gases driving the turbine of the turbocharger also increase measurably, allowing the compressor of the turbocharger to supply more supercharged air than is required by the engine under the specific conditions. This compounding or pyramiding of engine power can lead to damage in both the engine and turbocharger.

In the past, waste gates have been employed to bypass a portion of the exhaust gases around the turbine of the turbocharger during such conditions so that the unsafe operating conditions will not occur. The reduced flow of exhaust gases to the turbine of the turbocharger prevents the compressor from overcharging the engine with supercharged air. U.S. Patent 3,150,814 issued to Evans et al., describes a waste gate system for turbocharger control, which is representative of those mentioned above.

While the waste gate type control systems do provide protection for the engine and turbocharger, they are also often responsible for lower engine efficiency since they are normally actuated by pressure only. For example, if the engine is operated in an environment where the intake air temperature is very high, the pressure in the intake turbocharger system will cause the waste gate to open even though unsafe parameters will not occur in the engine under these particular conditions.

Critical in the engine in such situation is the density of the air or the fuel/air mixture entering the engine cylinders. Thus, if the intake temperature of the air is very high, the pressure which actuate the waste gate system will occur even though the density of the air or fuel/air mixture entering the cylinders is not critical, as would be the case with cooler intake air temperatures.

The instant invention is designed to control the density of the air or fuel/air mixture entering the engine from the turbocharger so that a maximum safe density is never exceeded, which will prevent damage to the engine under the conditions described above, yet allow maximum safe power output. Further, since the control system monitors density only, the engine can be operated at higher efficiencies in all tyes of environments, including higher and lower elevations where differences in ambient pressure are present. In addition, the control system can be fabricated simply and cheaply thereby providing improved, safe engine performance at reduced cost.

SUMMARY OF THE INVENTION

In turbocharged, carburated, internal combustion engines an improved turbocharger regulator system includes a throttling means downstream of the compressor outlet of the turbocharger whereby the supercharged air flow in the intake manifold to the engine can be regulated, regulator means downstream of the compressor outlet having pressure and temperature sensing units in communication with the supercharged air, the regulator means also having an ambient pressure sensing unit, and control means operably connecting said regulator means and said throttling means whereby the throttling means is adjusted relative to ambient pressure and supercharged air pressure and temperature in the intake manifold so that a maximum safe density is never exceeded in the cylinders of the engine.

BRIEF DESCRIPTION OF THE DRAWINGS

Advantages of this intake control system, its construction and operation will be more fully understood by referring to the following detailed description, read in conjunction with the attached drawings, wherein.

DESCRIPTION OF A PREFERRED EMBODIMENT

Figure 1:
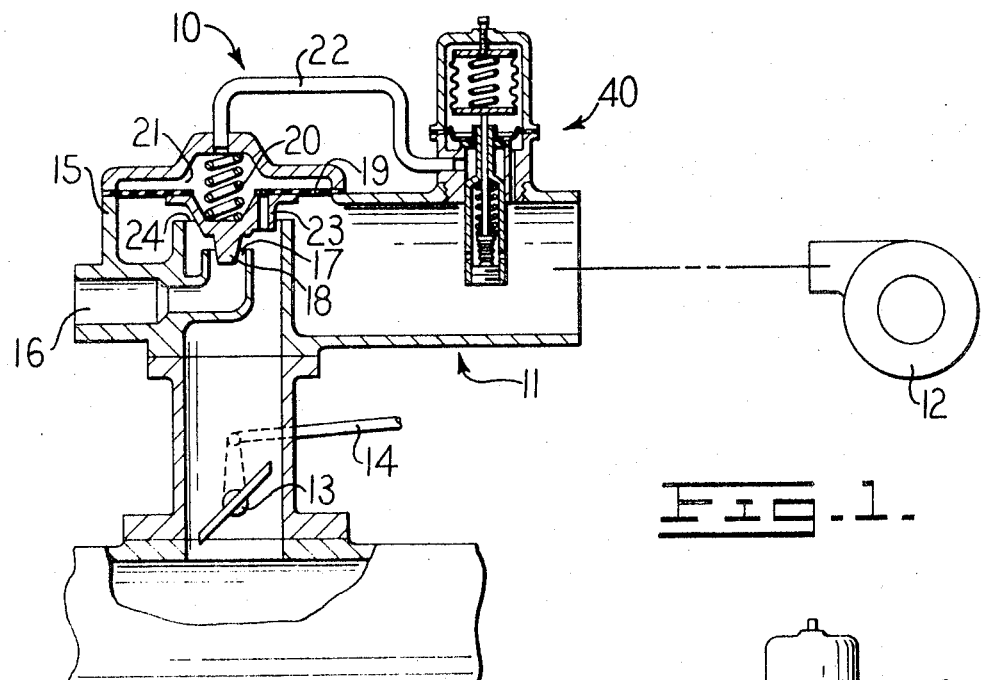
FIG. 1 is a partial vertical section of a portion of the intake manifold of a turbocharged, internal combustion engine with the turbocharger schematically illustrated.

In FIG. 1 an improved density limiting control system 10 for turbocharger is shown installed on the intake manifold 11 of an engine (not shown) which receives supercharged air from the compressor 12 of a turbocharger driven by the engine exhaust gases. The manifold includes a throttle butterfly valve 13 which, through linkage 14, is connected to the throttle lever of the engine for controlling engine speed. This linkage may alternately be connected directly to a governor system.

Between the throttle butterfly valve and the compressor in the intake manifold is a carburator section 15 which includes a gas inlet 16 and a regulating inlet gas orifice 17 which meters natural gas into the manifold in response to the demands of the throttle setting. A tapered plug 18 supported on a flexible diaphragm 19 reciprocates in the inlet orifice in response to the static pressure in the manifold to meter the proper amount of fuel to the engine. Spring 20 in chamber 21 biases the tapered plug to a closed position in the inlet orifice and normally the chamber is gas loaded for certain, preselected operating conditions.

In the instant system the gas load in chamber 21 is varied by pressure in a line 22 controlled by a pressure signal from a regulator unit 40 of the novel control system. Also, the tapered plug 18 has a cylindrical outer skirt assembly 23, which in cooperation with a throat opening 24, throttles the flow of supercharged air from compressor 12 of the turbocharger as it passes to the cylinders of the engines. In this particular embodiment the flow of the supercharged air and fuel are controlled simultaneously by reciprocating the element supported on the diaphragm so that the fuel/air mixture received by the engine is essentially in the proper proportion at all times.

Figure 3:
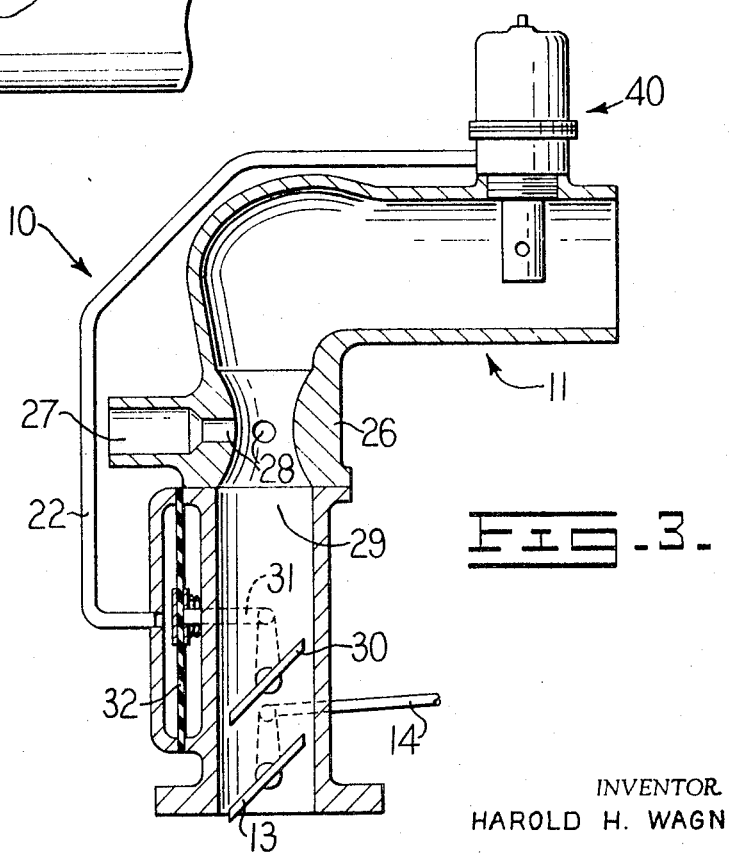
FIG. 3 is a vertical section of an intake manifold with a modified throttling apparatus.

In FIG. 3, a gasoline carburating section 26 replaces the natural gas carburating section shown in FIG. 1. Its gas inlet 27 feeds ports 28 in a venturi throat 29 for supplying the fuel demands for the engine in proportion to the air passing through the venturi throat in a conventional manner. In this embodiment throttling for turbocharging control is done downstream of the carburating section by a butterfly valve 30 which is controlled by arm 31 connected to a flexible diaphragm 32 in a pressure responsive unit. The diaphragm position is controlled by the bias of spring 33 and a pressure signal through line 22 from the regulating unit 40.

Essentially the circular skirt 23 in the carburating section 15 of FIG. 1 and the butterfly valve 30 shown in FIG. 3 perform the same function, limiting the density of the supercharged air or fuel/air mixture entering the engine in response to a pressure regulating signal.

Figure 2:
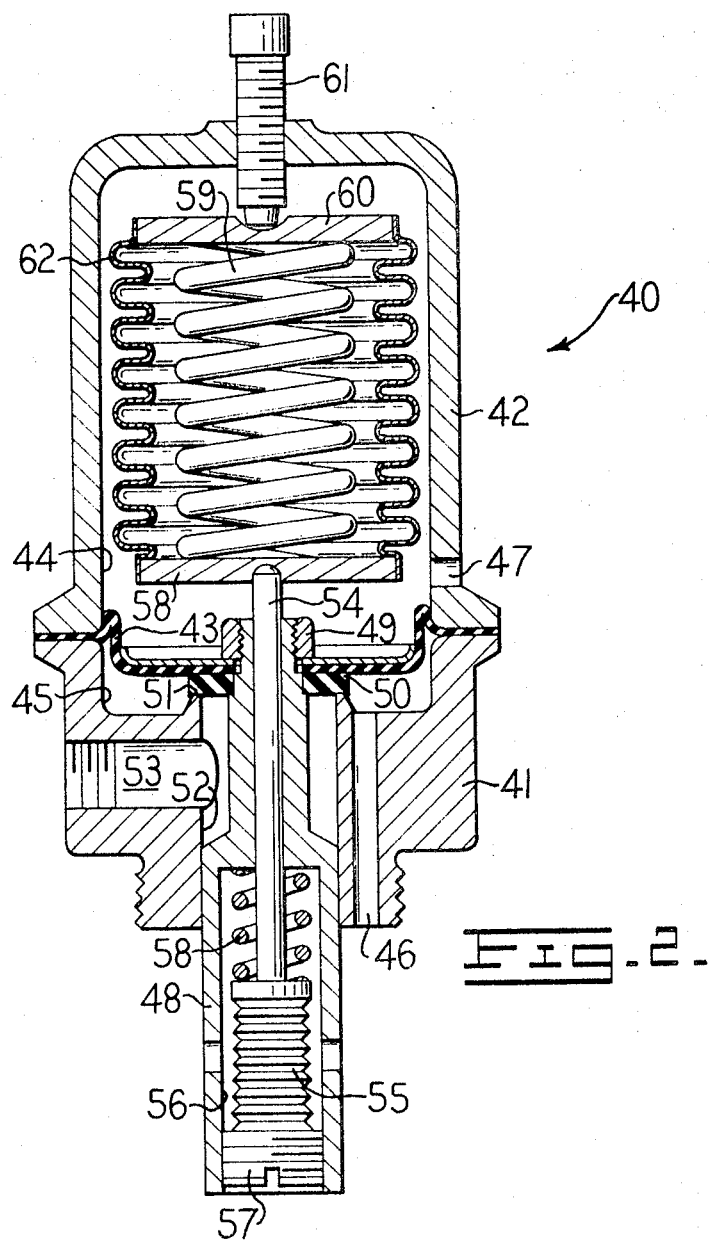
FIG. 2 is a vertical section of the regulator unit showing in FIG. 1 in enlarged detail.

Regardless of the throttling means employed to control the density of the supercharged air or the fuel/air mixture downstream of a throttling means, the regulator unit is essentially the same and is best shown in FIG. 2. It has a threaded base portion 41 and a hollow cap structure 42 which is joined to the base with a flexible diaphragm 43 sandwiched therebetween so an upper chamber 44 and a lower chamber 45 are formed. When the threaded portion of the base is screwed into the manifold 11, as shown in FIG. 1, passage 46 provides communication between chamber 45 and the supercharged air from the compressor of the turbocharger while chamber 44 is in communication with ambient pressure via port 47.

Centrally attached to the flexible diaphragm 43 is a valve unit comprising a step plunger 48 secured to the diaphragm with a washer and nut 49. A seal 50 carried on the plunger seats on an annular valve seat 51 to close chamber 45 from bore 52 and port 53 to which line 22 is connected for operating the pressure sensitive control operating the throttling means. Utilizing this system, pressurized air (supercharged air) from the intake manifold is metered to the pressure sensitive control means to control the degree of throttling in the intake manifold for turbocharger control.

Coaxially and reciprocally disposed in the plunger is a rod 54 having one end projecting above the nut 49 with its opposite end abutting on a bellows-type thermal element 55 retained in the hollow bottom end 56 of the plunger with cap screw 57. Spring 58 retains the thermal element in position and ports 59 in the wall of the plunger insures that the thermal element will be in constant communication with the supercharged air in the intake manifold. Through this arrangement the length of the rod projecting above nut 45 will change proportionally to the temperature sensed by the thermal element since the element will expand or contract axially depending upon the temperature of the supercharged air in the intake manifold.

A recess on the bottom of the circular plate 58 receives one end of rod 54 and supports a spring 59 on its top side within the hollow cap structure. A similar plate 60 restrains the top of spring and the end of a tap bolt 61 threaded into the top of a cap structure abuts on this top plate in a recess provided for this purpose, so that the spring force between the several plates can be adjusted through the use of the cap screw.

A cylindrical bellows 62 surrounds the spring and is sealed at the top and bottom ends to the circular plates, 58 and 60. The gas load within the bellows is usually set to standard pressure. Thus, depending on the ambient pressure where the engine is operating, the pressure within the bellows either aids or restrains the force of spring 59 acting on the top of rod 54 which urges seal 50 onto valve seat 51.

When the regulator unit 40 is assembled or manifold 11 as shown in FIG. 1, it will sense both the pressure in temperature of the supercharged air, and also the ambient pressure so that the pressure control signal sent through line 22 to the pressure sensitive control means actuating the throttling means will limit the density of a supercharged air or fuel/air mixture entering the cylinders of the engine to a maximum safe, predetermined density. When throttling occurs less exhaust gases will be available to drive the turbine of the turbocharger and the increased back pressure in the intake manifold upstream of the throttling means will tend to load the compressor so that a turbocharger overspeed will not occur.

In the above system a fuel/air mixture entering the engine cylinders will never exceed the maximum predetermined density within which the engine can operate safely, but the system will always keep the density at a maximum until an unsafe density develops. Through this type of control, maximum efficiency is obtained in all environmental conditions in which the engine may be operated. The bellows arrangement will compensate for higher elevations while the thremal element will adjust the regulating unit for variations in temperature thereby avoiding compromises which result in loss of efficiency. Thus, the response of the regulatory unit is such that the density of the fuel/air mixture never exceeds the maximum safe prescribed density for the engine.

The instant system is both economical and trouble free in operation; and, in addition, provides a much more precise control of engine turbocharger than do the previously described waste gate systems.

I claim:

1. In combination with a carburated, internal combustion engine having an intake manifold and a turbocharger feeding supercharger air to said intake manifold and a throttle valve controlling the flow of the fuel-air mixture to the cylinders of the engine, an improved turbocharger regulating control system comprising:

a regulating transducer mounted in said intake manifold to monitor the temperature and pressure of said supercharged air in said intake manifold, said regulating transducer also having an element responsive to ambient air pressure and a signal output related to ambient air pressure and supercharger air pressure and temperature;

control means connected to said regulating transducer to receive said signal output; and variable restriction means in said intake manifold downstream of said regulating transducer and driven by said control means whereby the density of said supercharged air entering the engine is maintained in a safe density range without loss of efficiency regardless of throttle position and changes in environmental conditions.

2. The combination as defined in claim 1 wherein the regulating transducer includes a housing with a central diaphragm, passage means through which one side of said diaphragm is exposed to the supercharged air in the intake manifold, signal means controlled by said diaphragm and biasing means operable on said diaphragm to adjust said signal means including a bellows sensitive to ambient air pressure and a thermal responsive means connected to said biasing means and in communication with said supercharged air whereby the bias on said diaphragm is proportional to ambient air pressure and the temperature of said supercharged air and the signal output from said regulating means is a function of ambient air pressure and supercharged air temperature and pressure.

3. The combination as defined in claim 2 wherein signal means is a valve and the output signal is a pressure output generated by bleeding a portion of the supercharged air acting on the diaphragm through said valve.

4. The combination as defined in claim 3 wherein the control means includes a pressure responsive means which balances the pressure signal output from the regulating means against the pressure in the intake manifold for controlling the variable restriction means in said intake manifold.

5. The combination as described in claim 1 wherein the intake manifold includes a carburating means between the regulating transducer and the variable restriction means for supplying fuel to the supercharged air passing through said carburating means.

6. The combination as described in claim 1 wherein the control signal is a metered flow of supercharged air from the intake manifold and the control means include pressure responsive means to actuate the variable restriction means.

7. A method of controlling a turbocharger feeding supercharged air to the intake manifold of a carburated internal combustion engine having a throttle controlling the air-fuel mixture to the cylinders of the engine comprising, sensing the temperature and pressure of the supercharged air in the intake manifold, sensing the ambient pressure to obtain a control signal related to said temperature and pressure for controlling the density of the supercharged air entering the engine, and using said signal to control variable restriction means whereby the flow of supercharged air to the engine is restricted to a maximum safe density independent the position of the throttle.

8. The method as defined in claim 7 which includes the step of adding carburated fuel to the supercharged air controlled by the throttling step.

References Cited
UNITED STATES PATENTS

| | | | |
|---|---|---|---|
| 2,088,954 | 8/1937 | Gregg | 123—119 |
| 2,305,070 | 12/1942 | Butler | 123—119 |
| 2,410,728 | 11/1946 | Fuscaldo | 123—119 |
| 2,988,872 | 6/1961 | Reggio | 123—119 |
| 2,989,840 | 6/1961 | Lieberherr | 123—119 |
| 3,096,614 | 7/1963 | Silver | 60—13 |
| 3,173,242 | 3/1965 | Erickson | 60—13 |

CARLTON R. CROYLE, Primary Examiner

DOUGLAS HART, Assistant Examiner

U.S. Cl. X.R.

123—119